United States Patent
Sonntag

[19]
[11] Patent Number: 5,877,600
[45] Date of Patent: Mar. 2, 1999

[54] PROCESS FOR DETERMINING A DESIRED LOAD VALUE FOR A LOAD-DEPENDENT CURRENT GENERATING SYSTEM IN AN ELECTRIC VEHICLE

[75] Inventor: Josef Sonntag, Illertissen, Germany

[73] Assignee: Daimler-Benz AG, Germany

[21] Appl. No.: 746,368

[22] Filed: Nov. 8, 1996

[30] Foreign Application Priority Data

Nov. 8, 1995 [DE] Germany .................. 195 41 575.2

[51] Int. Cl.$^6$ .............................................. H01M 8/04
[52] U.S. Cl. ........................ 318/139; 429/23; 429/24; 180/65.3
[58] Field of Search .................... 318/140, 153, 318/139; 180/54.1, 65.1, 65.3; 290/14, 40 R; 320/5, 61; 429/12, 13, 17, 19, 22–25, 72

[56] References Cited

U.S. PATENT DOCUMENTS

| | | |
|---|---|---|
| 3,650,345 | 3/1972 | Yardney . |
| 4,438,342 | 3/1984 | Kenyon . |
| 4,741,978 | 5/1988 | Takabayashi . |
| 5,461,289 | 10/1995 | Adler et al. . |
| 5,545,928 | 8/1996 | Kotani .................... 290/40 C |
| 5,550,445 | 8/1996 | Nii ........................ 318/153 |
| 5,631,532 | 5/1997 | Azuma et al. ............... 320/5 |
| 5,646,852 | 7/1997 | Lorenz et al. .......... 364/431.051 |
| 5,658,681 | 8/1997 | Sato et al. . |

FOREIGN PATENT DOCUMENTS

| | | |
|---|---|---|
| 41 33 059 | 4/1993 | Germany . |
| 43 22 765 | 6/1994 | Germany . |
| PCT/FR90/00302 | 11/1990 | WIPO . |
| PCT/DE92/00824 | 3/1994 | WIPO . |

Primary Examiner—Bentsu Ro
Attorney, Agent, or Firm—Evenson, McKeown, Edwards & Lenahan, P.L.L.C.

[57] ABSTRACT

This invention provides a process for determining a desired load value for a load-dependent current generating system, particularly a fuel cell system, in an electric vehicle. Based on an accelerator pedal demand, a desired value for the motor line currents of the electric driving motor is determined in the driving motor converter, and therefrom a desired load value is generated directly for the current generating system.

5 Claims, 3 Drawing Sheets

PROCESS FOR DETERMINING A DESIRED LOAD VALUE FOR A LOAD-DEPENDENT CURRENT GENERATING SYSTEM IN AN ELECTRIC VEHICLE

BACKGROUND AND SUMMARY OF THE INVENTION

This invention relates to a process for determining a desired load value for a load-dependent current generating system, particularly a fuel cell system, in an electric vehicle.

German patent document DE 43 22 765 C1 discloses a process for dynamic control of the power of an electric driving unit in a vehicle which is supplied with electric energy by a fuel cell arranged in the vehicle. Based on a power demand determined from an accelerator pedal position, the mass air flow which is necessary for the fuel cell to provide the desired power is determined as a function of the instantaneous rotational speed of the electric driving motor, by means of characteristic diagrams. The air flow is then adjusted by controlling the rotational speed of a compressor arranged in the air intake pipe.

A disadvantage of this system is that an experimentally determined adjustment of the characteristic diagrams is required in order to coordinate the vehicle drive and fuel cell system. It is also a disadvantage that the air supply of the fuel cell is adapted in a time-delayed manner to an existing actual power or current value of the vehicle drive, resulting in an undersupply of air to the fuel cell during acceleration operations, and thus a rise of the probability of power breaks.

It is therefore an object of the present invention to provide a process for determining a desired load value for a load-dependent current generating system in an electric vehicle, with improved dynamics.

This object is achieved by the process according to the invention, in which a desired current value is generated directly in the driving motor converter. This arrangement has the advantage, on the one hand, that the need for adjustment of the characteristic current or power diagrams is eliminated. On the other hand, vehicle handling is improved by the provision of a front-connected air supply, so that there need no longer be an accelerator pedal limitation during acceleration, and the number of cell voltage alarms is reduced.

Other objects, advantages and novel features of the present invention will become apparent from the following detailed description of the invention when considered in conjunction with the accompanying drawings.

DETAILED DESCRIPTION OF THE DRAWINGS

For vehicles driven by an electric motor, there are various approaches for providing the necessary electric energy. On the one hand, batteries can be used to store intermediately the required electric energy, which can either be generated outside the vehicle (and supplied to the battery in a charging operation), or be generated directly in the vehicle by means of a current generating system. In such systems, it is acceptable for the power of the current generating system to vary within a wide range; that is, because of the buffer effect of the battery, the power of the current generating system is uncoupled from the motor power.

It is also possible to generate electric energy in the vehicle and supply it to the electric driving motor without the intermediate connection of a buffer battery. In this case, in order to ensure good energy utilization, however, the power output of the current generating system must be adapted as closely as possible to the instantaneous current demand of the electric driving motor. For this purpose, a desired value for the power of the current generating system must be generated continuously, and the power of the current generating system must then be controlled or regulated correspondingly. In order to obtain good driving dynamics, generation of the desired value and the subsequent control or regulation of the current generating system must take place correspondingly rapidly.

A known load-dependent current generating system for electric vehicles is the fuel cell. It should be noted, however, that although the invention will be described herein in the context of a fuel cell system, the object of the invention is not so limited, and can be used for any load-dependent current generating system for electric vehicles.

Figure 1:
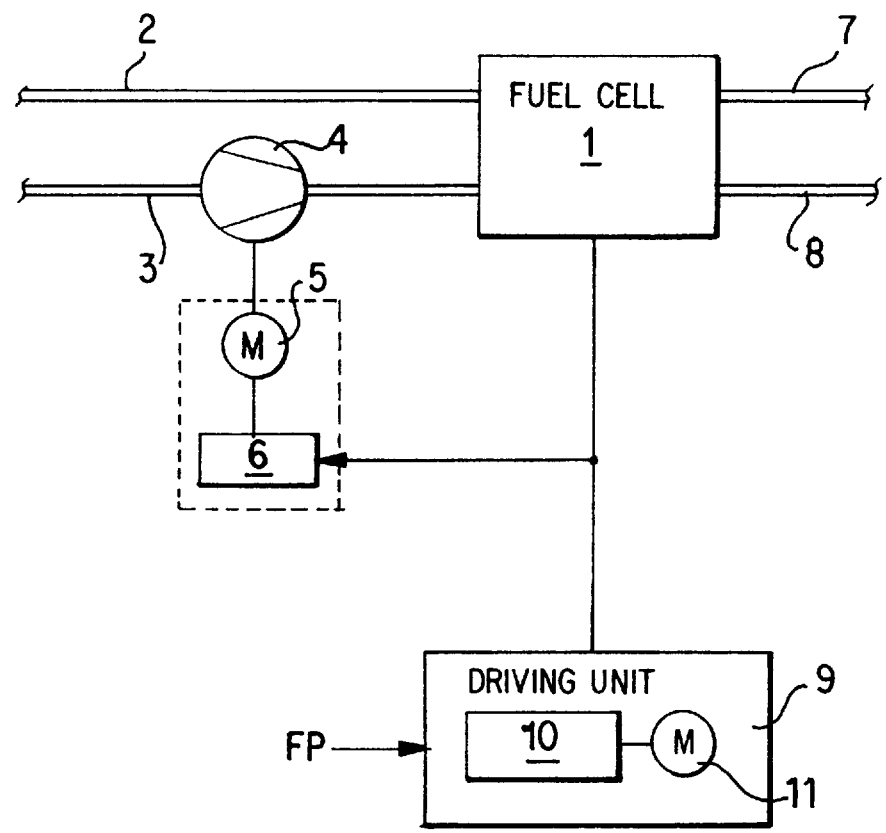
FIG. 1 is a basic diagram of a vehicle propulsion system including a fuel cell, a driving motor and a motor control system.

Referring to FIG. 1, the fuel cell 1 may be, for example, a fuel cell with a proton-conducting membrane called a PEM cell. It is supplied with a fuel, such as hydrogen gas, by way of a first feed pipe 2, while a second feed pipe 3 and a compressor 4 supply a pressurized oxidant, preferably oxygen or ambient air. In the fuel cell 1, the fuel is oxidized on the anode and the oxidant is reduced on the cathode, the anode and the cathode being separated from one another by a proton-conducting membrane in order to avoid an oxyhydrogen reaction between the hydrogen and the oxygen. During this electrochemical reaction, a voltage is generated between the two electrodes. By means of the parallel or series connection of many such cells to form a so-called stack, voltages and current intensities can be reached which are sufficient for driving a vehicle.

As shown in FIG. 1, an electric motor 5 is provided to drive the compressor 4, with a compressor converter 6 which regulates the rotational speed $n_K$ of the electric motor 5 (and hence, the speed of the compressor 4). The rotational speed $n_K$, of the compressor 4 thus influences the oxidant mass flow $V_{L\text{-}act}$, and the power PBZ generated by the fuel cell 1. Gases are discharged from the anode and the cathode by way of discharge pipe 7, 8. To drive the vehicle, a driving unit 9 consists of a driving motor converter 10 and of an electric driving motor 11.

In order to control the air supply to the fuel cell 1 to coincide with the power or current consumption of the driving unit 9 (and therefore, if possible, to avoid a limitation of the accelerator pedal demand FP during the acceleration), in the process according to the invention, a desired value for current output $I_{FP}$ for the fuel cell 1 is generated by an additional device in the driving motor converter 10. (See FIG. 3, discussed below.) For this purpose, the driving motor converter 10 determines desired values for the motor line currents $I_{MS\text{-}des}$ (i) of the electric driving motor 11, based on the torque demand $Md_{des}$ transmitted to the driving unit 9. Using the desired motor line currents, the desired current output $I_{FP}$ for the fuel cell is then generated by the additional device 20 as a function of the driving motor or intermediate circuit voltage U, $U_{BZ}$, the power adjuster temperature $T_{LS}$ and its efficiency $\eta^{LS}$ (The power adjuster comprises load semiconductors, for example $I_{FB}$, which are part of the driving motor converter and adjust the desired motor line currents in a known manner.) From the desired current value $I_{FP}$ a desired value for the rotational compressor speed $n_{K\text{-}des}$ is then determined, and adjusted correspondingly.

The respective desired vales $I_{MS\text{-}des}(I)$, $I_{FP}$ can therefore be provided to the electric driving unit 9 and to the air supply virtually simultaneously with the demand. As a result of this front-connected air supply, limitation of the driving power during the acceleration because of the fuel cell system 1 will no longer occur. Likewise, fewer cell voltage alarms $U_{ZA}$ are to be expected in the fuel cell 1, which, on the whole, results in a better vehicle handling.

Drive controls for rotary-current electric motors are known from prior art, for example, from the journal *Elektronik*, Volume 21/1994, Pages 58, and on. Since, in addition, the drive control per se is not the object of the invention, its principle will be explained here only briefly by means of FIG. 2. The drive control consists of a desired-value generator 12, a position controller 13, a rotational speed controller 14, a coordinate transformation unit 15, a phase current controller 16 and a pulse width modulator 17 which drives a three phase DCAC inverter unit 19. Preferably, the drive control is integrated in the driving motor converter 10, and may have an analog as well as in a digital construction. Based on the accelerator pedal demand FP, desired values for the motor line currents $I_{MS\text{-}des}(i)$ are determined in the drive control, and are supplied to the electric driving motor 11.

In addition to the actual values of the motor line current $I_{MS\text{-}act}$ (i) the values for the speed and for the absolute angle position of the rotor of the electric driving motor 11, detected by means of the so-called resolver 18, are fed back as control quantities to the drive control. In the case of conventional diagram-oriented drive controls, the actual motor line currents $I_{MS\text{-}act}$ (1) and the respective desired values $I_{MS\text{-}des}$ (1) of the motor line currents are available approximately every 70 μs. It is therefore possible to calculate the desired value for the fuel cell output current $I_{FP}$ to be provided to the electric driving motor 11, from the desired values $I_{MS\text{-}des}$ (i) for the motor line currents directly in the driving motor converter 10.

Figure 2:
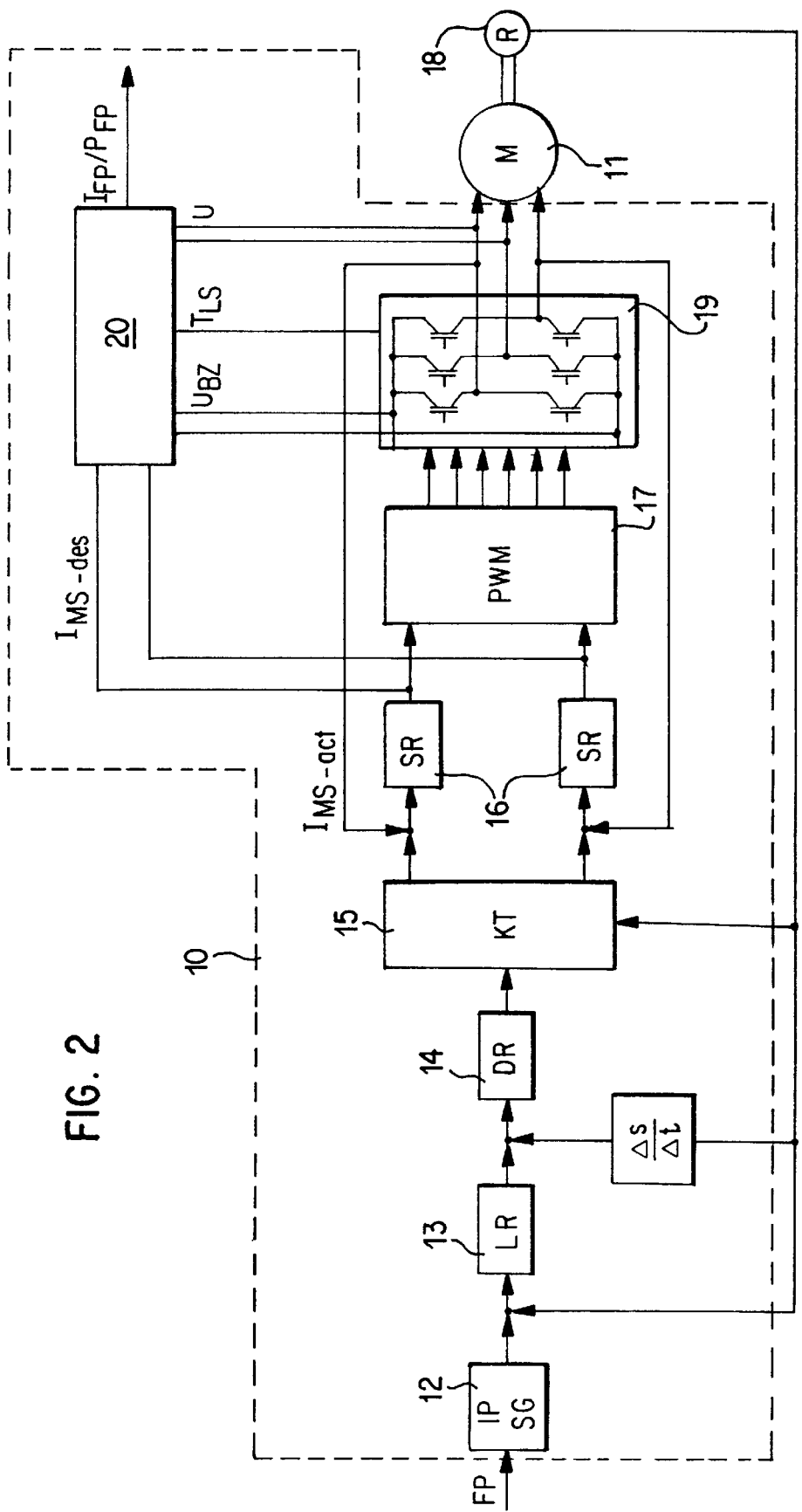
FIG. 2 shows a drive control for an electric driving motor with an integrated desired-value generation.
Figure 3:
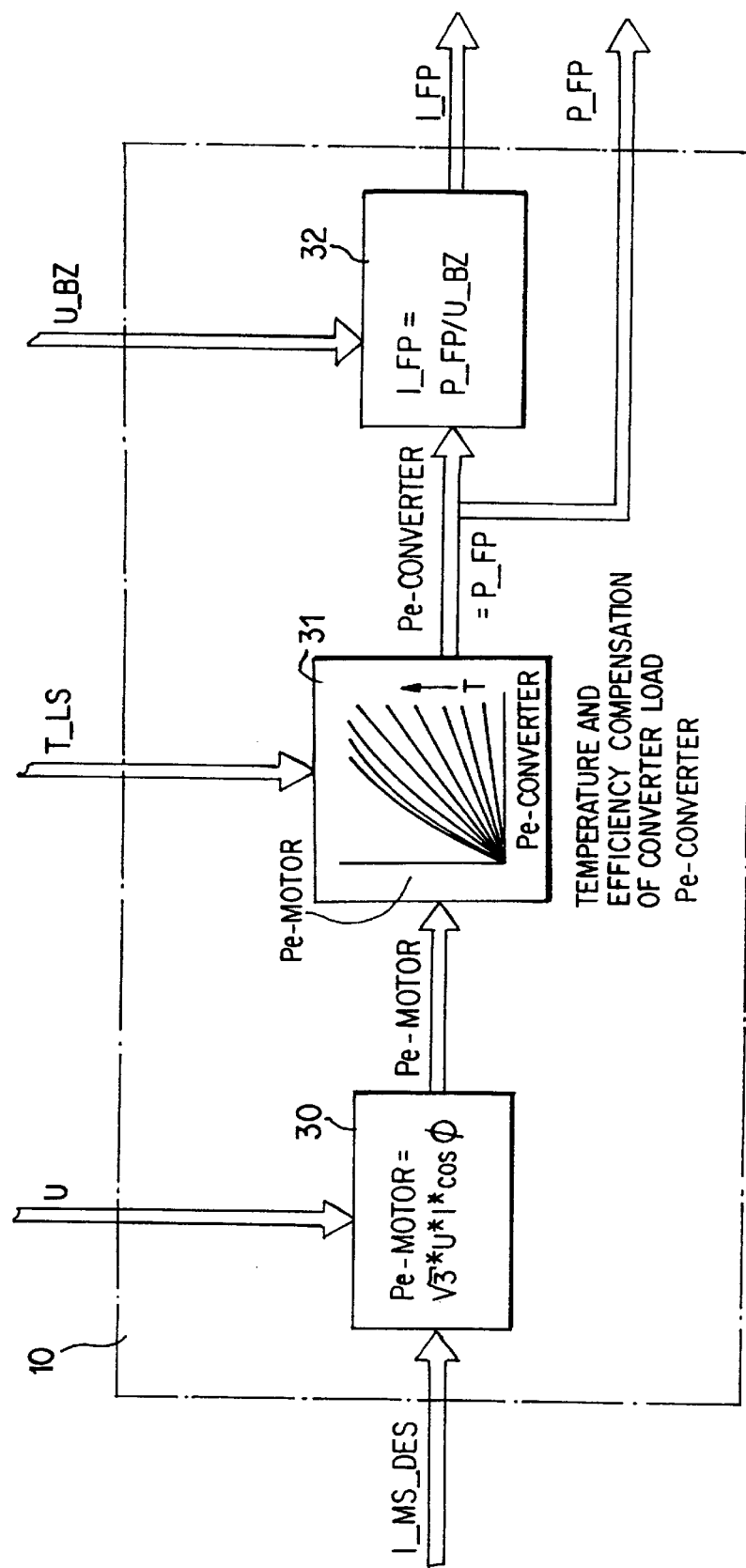
FIG. 3 is a diagram which shows the generation of the desired current value within the driving motor converter.

For this purpose, according to the invention, the desired motor line values $I_{MS\text{-}des}$ (i), the motor or intermediate-circuit voltage U, $U_{BZ}$ and the power adjuster temperature $T_{LS}$ (FIG. 2) are detected in the driving motor converter 10 and therefrom a desired fuel cell current value $I_{FP}$ or a desired power value $P_{FP}$ are determined, as shown in FIG. 3. In block 30, the desired motor line current value IMS-des and voltage value U (FIG. 2) are used to generate a motor power value $P_{e\text{-}motor}$. In order to compensate for variations in the power adjuster temperature $T_{LS}$ and efficiency $\Theta_{LS}$, stored characteristic diagrams can be used for the temperature and/or efficiency compensation, as shown in block 31. Finally, in block 32, the desired value for fuel cell output current IFP is calculated by dividing the power value $P_{FP}$ by the intermediate circuit voltage $U_{BZ}$ (FIG. 2). The values of $I_{FP}$ and $P_{FP}$ thus determined are then output for controlling the rotational speed $n_K$ of the compressor motor 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for controlling an output from a load-dependent current generating system in an electric vehicle, comprising the steps of reading an accelerator pedal demand value input by a vehicle operator;

calculating desired values for motor line currents for the electric driving motor, based on said accelerator pedal demand value;

calculating a desired output current for the current generating system based on said desired values for motor line currents; and controlling an input of fuel to said current generating system as a function of said desired output current.

2. Process according to claim 1 wherein said desired output of the current generating system is corrected based on at least one of temperature and efficiency of said current generating system.

3. Process according to claim 1 wherein said desired output current is corrected by means of characteristic diagrams.

4. Process according to claim 1 wherein said current generating system is a fuel cell.

5. Process according to claim 1 wherein said output of said current generating system comprises one of a desired power value and a desired current value.

* * * * *